Oct. 1, 1968

V. A. MARTENS 3,403,464

ELECTRIC IRON WITH PUSHBUTTON VALVE CONTROL MECHANISM
FOR CONVERTING FROM DRY TO STEAM OPERATION
AND VICE VERSA

Filed Feb. 20, 1967

INVENTOR.
VINCENT A. MARTENS
BY
Bertha L. MacGregor
ATTORNEY

Oct. 1, 1968  V. A. MARTENS  3,403,464
ELECTRIC IRON WITH PUSHBUTTON VALVE CONTROL MECHANISM
FOR CONVERTING FROM DRY TO STEAM OPERATION
AND VICE VERSA
Filed Feb. 20, 1967  3 Sheets-Sheet 3

INVENTOR.
VINCENT A. MARTENS
BY
Bertha L. MacGregor
ATTORNEY

United States Patent Office 3,403,464
Patented Oct. 1, 1968

3,403,464
ELECTRIC IRON WITH PUSHBUTTON VALVE CONTROL MECHANISM FOR CONVERTING FROM DRY TO STEAM OPERATION AND VICE VERSA
Vincent A. Martens, Racine, Wis., assignor to Scovill Manufacturing Company, Waterbury, Conn., a corporation of Connecticut
Filed Feb. 20, 1967, Ser. No. 617,370
11 Claims. (Cl. 38—77)

ABSTRACT OF THE DISCLOSURE

An electric iron having a co-axial pushbutton, valve stem and seat, and mechanism between the pushbutton and valve stem for moving the stem to closed-valve "dry" position or open-valve "steam" position by successive depression of the pushbutton, including means for adjusting thermostatic mechanism which controls sole plate temperature and varies the volume of water passing to the sole plate. The valve actuating mechanism comprises rotated means movable into locked and unlocked positions by actuation of the pushbutton for successively holding the valve stem in closed and open valve positions.

---

This invention relates to electric irons and more particularly to mechanism for controlling valve operation in electric irons for the purpose of converting the iron from steam to dry operation and vice versa.

The valve control mechanism of this invention is pushbutton operated for retracting a valve stem to an open-valve position for steam passage to the sole plate of the iron, and for advancing the valve stem to a closed-valve position for dry-iron operation. The valve control mechanism comprises a vertically disposed valve stem and a pushbutton co-axial therewith, mounted in the forward end of the iron, with the pushbutton located in the upper wall of the handle of the iron. When the button is in its raised position, the valve stem also is raised and the valve is open. Manual depression of the button causes the valve stem to be moved downwardly into contact with the valve seat, where it is held in the advanced position for closed valve "dry" operation by locking means located between the button and stem, until the button again is depressed to actuate the locking means for releasing the valve stem and permitting automatic upward movement of the stem to the retracted open valve "steam" position.

The invention also comprises means for adjusting thermostatic mechanism which controls the temperature of the sole plate, and for varying the volume of water passing to the sole plate for conversion to steam. When the thermostatically controlled temperature is raised, the volume of water is increased accordingly.

The objects and advantages of the invention will be apparent from the drawings and following description.

Figure 1:
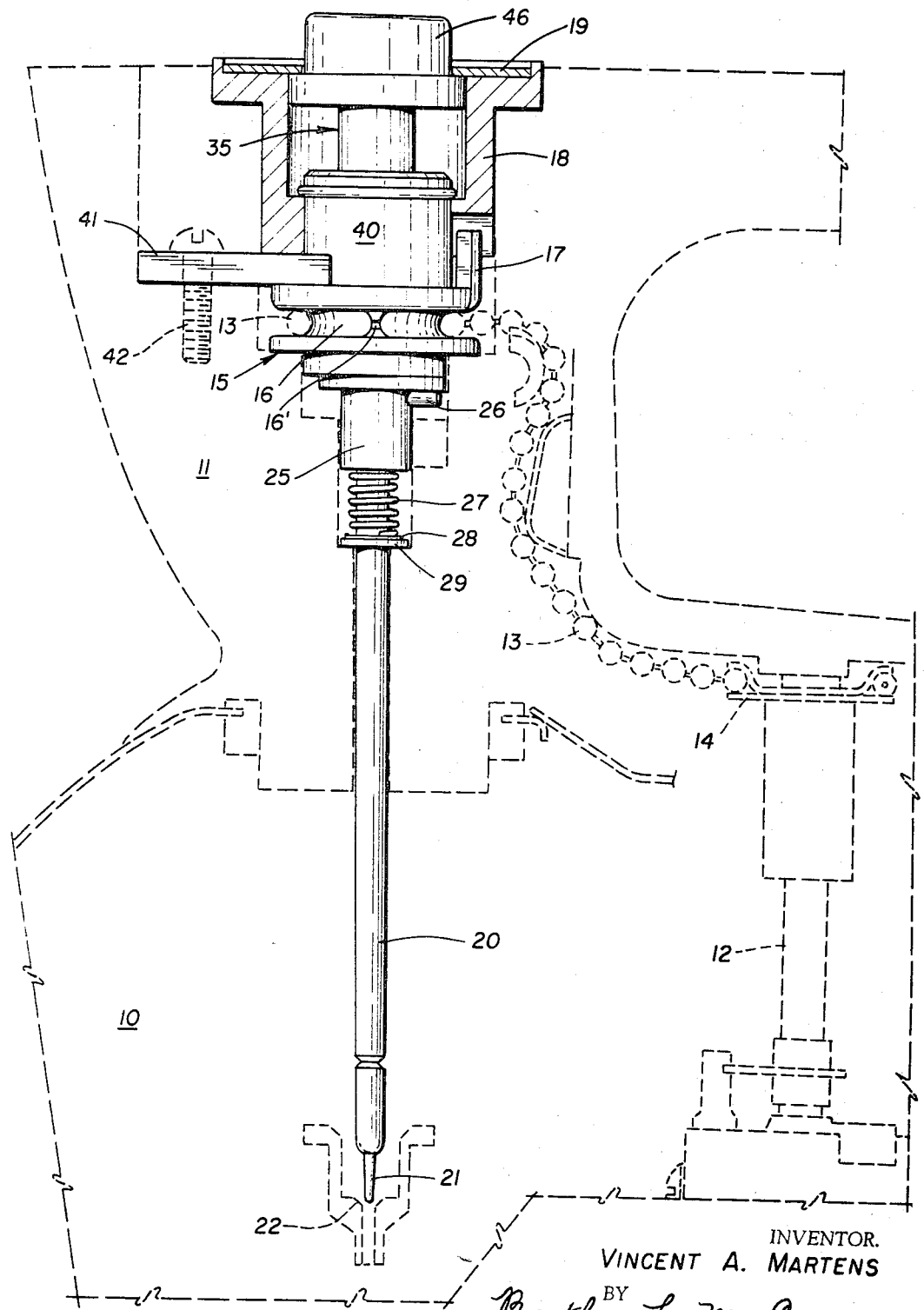
FIG. 1 is an elevational side view, partly in section, of the valve actuating mechanism, showing in broken lines the forward end of the iron in which the mechanism is mounted.

In the embodiment of the invention shown in the drawings, the forward end of an electric iron is indicated at 10 and the handle portion at 11. A thermostatic temperature control mechanism 12, for controlling sole plate temperature, is adjusted by means of an endless bead chain 13 trained around the thermostatic member at 14 and around the rotatable drive member 15 grooved at 16 to receive the chain 13. A tooth 16' in the groove 16 engages the chain 13 for moving the chain with the rotated member 15. The drive member 15 is provided with an upwardly extending finger 17 which is engaged in the slotted vertical tubular wall 18 of a manually rotatable dial 19 which bears thermostatic indicia. The lower surface of the drive member is a cam surface. Its function will be described hereinafter. The temperature control mechanism 15–19 is mounted on, but functions independently of, the pushbutton actuated valve mechanism herein described.

Figure 2:
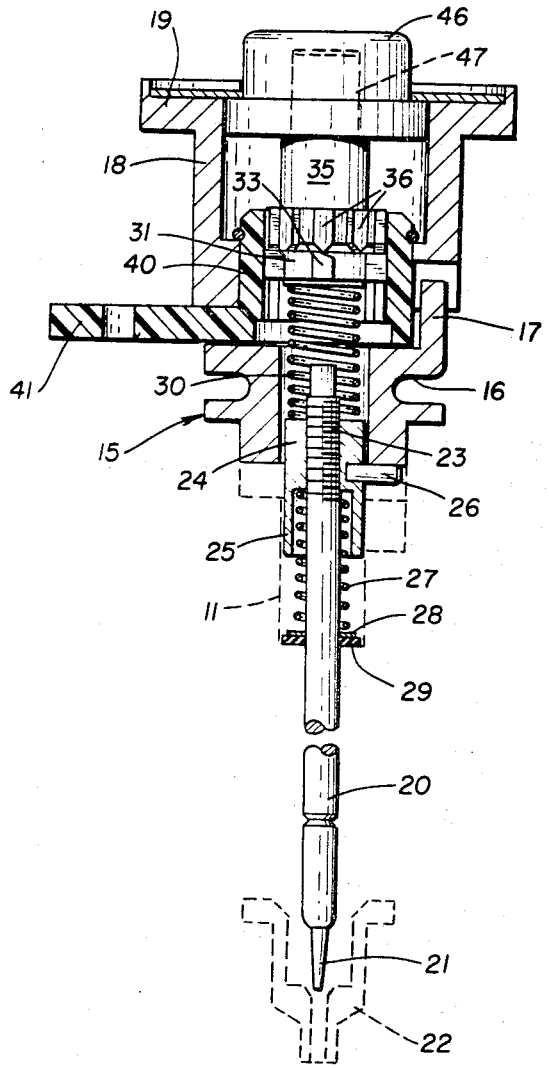
FIG. 2 is a vertical sectional view of the valve actuating mechanism in protracted open valve "steam" operative position.
Figure 4:
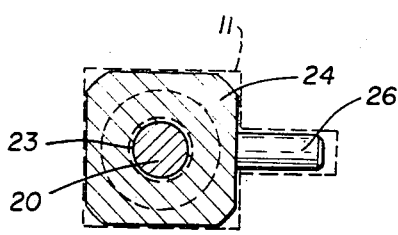
FIG. 4 is a horizontal sectional view in the plane of the line 4—4 of FIG. 3.
Figure 3:
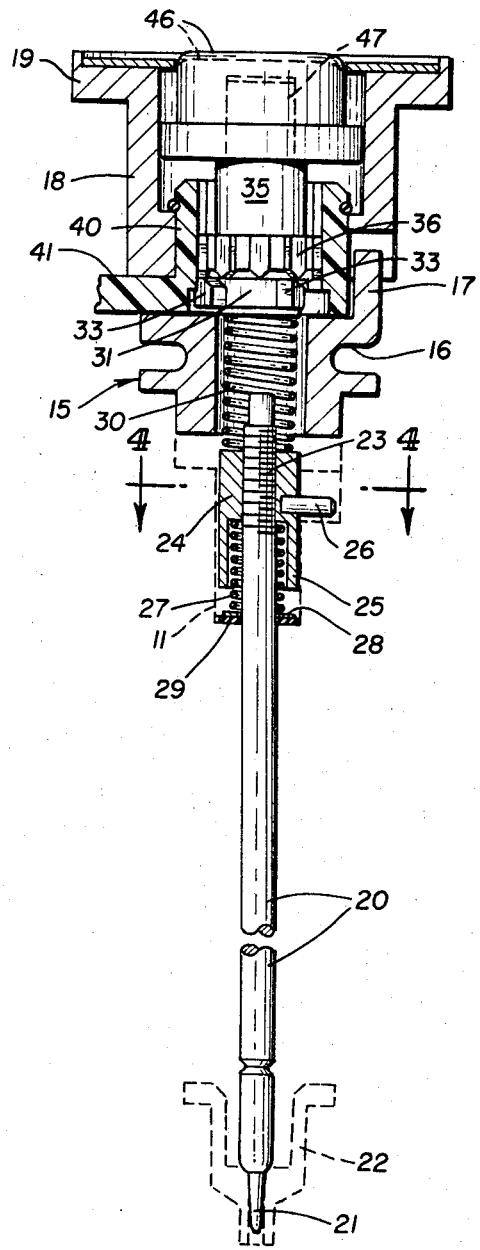
FIG. 3 is a vertical sectional view of the valve actuating mechanism in retracted closed valve "dry" operative position.
Figure 5:
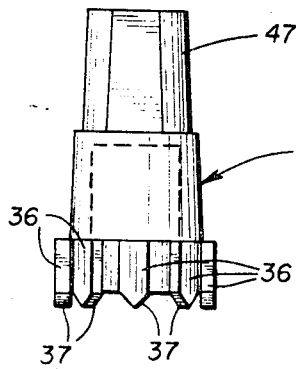
FIG. 5 is an elevational view of a splined drive button, detached from the rest of the valve actuating mechanism.
Figure 6:
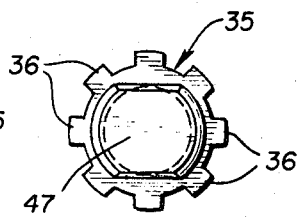
FIG. 6 is a top plan view of the button of FIG. 5.
Figure 7:
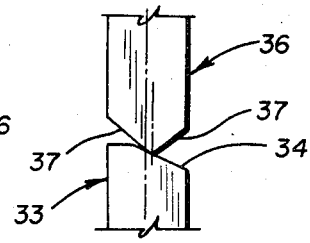
FIG. 7 is a diagrammatic view showing the center lines of one of the teeth of the drive button of FIG. 5 and one of the teeth of a ratchet spline shown in FIG. 8.
Figures 8, 9:
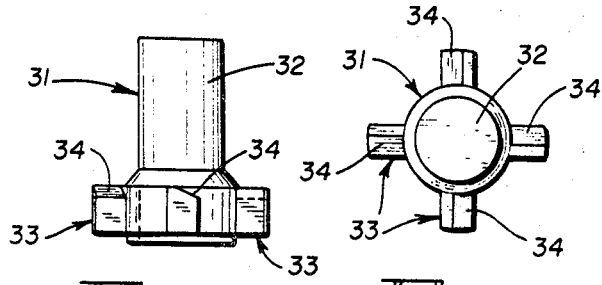
FIG. 8 is an elevational view of the ratchet spline which is actuated by the drive button of FIG. 5.
FIG. 9 is a top plan view of the ratchet spline of FIG. 8.

A vertically disposed elongated valve stem 20 with tapered lower tip 21 is axially reciprocable for movement into contact with the valve seat 22 as shown in FIG. 3, for closed-valve "dry" iron operation, and for upward movement as shown in FIG. 2, for open-valve "steam" operation. At its upper end, the valve stem 20 is threaded at 23 for adjustably mounting thereon a cam body block 24 provided with a recessed lower end 25 and a horizontally projecting cam follower in the form of a pin 26. The cam follower pin 26 underlies the cam surface on the bottom of the member 15. A coiled spring 27, or first resilient means, surrounds the valve stem 20 within the recessed end 25 of the cam body block 24, bearing at its upper end against the block 24 and at its lower end against a metal washer 28 on a rubber washer 29 supported in a recessed part of the iron handle 11. A coiled spring 30, or second resilient means, surrounds the upper end of the stem 20, bearing on the upper surface of the cam body block 24. The spring 30 is confined in the central bore of the thermostat control drive member 15 and bears at its upper end against the lower surface of a ratchet spline 31 shown in detail in FIGS. 8 and 9. The ratchet spline 31 comprises a tubular body 32 and four teeth 33 extending radially and spaced circumferentially 90 degrees apart on the lower portion of the body 32. The upper surfaces 34 of the teeth 33 are inclined as shown in FIGS. 7 and 8. The body 32 is rotatable within the hollow body of a splined drive button 35 which is part of the pushbutton assembly. The splined drive button 35 has teeth 36 with oppositely inclined lower edges 37 which bear on the rotatable ratchet spline teeth 33.

Figure 10:
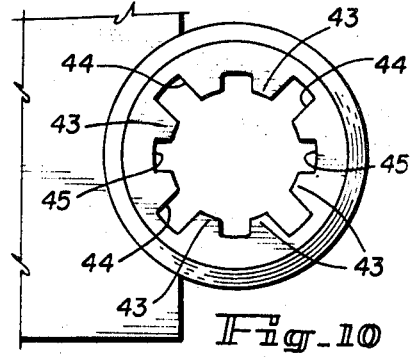
FIG. 10 is a top plan view of the splined sleeve shown in FIG. 11.
Figure 11:
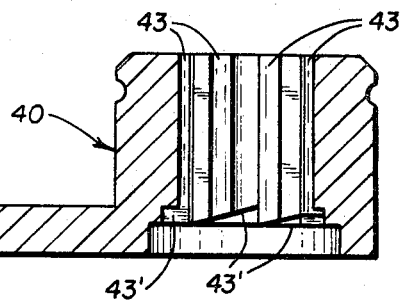
FIG. 11 is a vertical sectional view in the plane of the line 11—11 of FIG. 12, of a splined sleeve in which the drive button of FIG. 5 and the ratchet spline of FIG. 8 are movable in axial directions.
Figure 13:
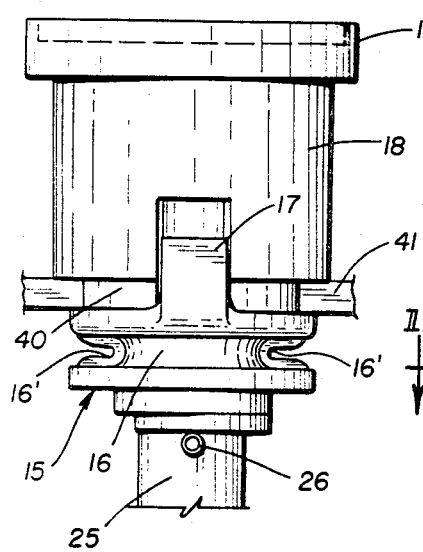
FIG. 13 is an elevational view of temperature control mechanism detached from the valve control mechanism and the thermostat adjusting means.
Figure 12:
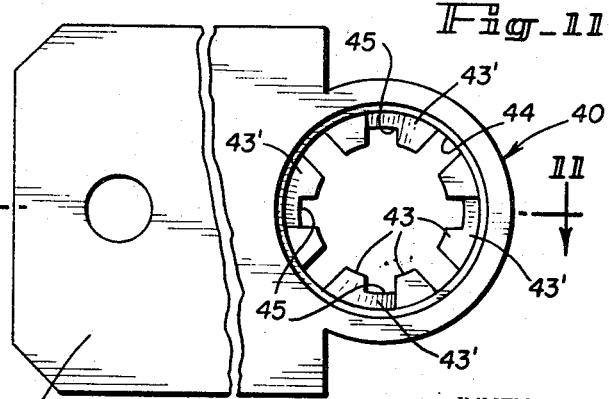
FIG. 12 is a bottom view of the sleeve of FIG. 11.

The ratchet spline 31 and splined drive button 35 are slidably mounted in a splined sleeve 40 stationarily mounted in the handle 11 by a bracket 41 and screw 42. As shown in FIGS. 10–12, the sleeve 40 is internally grooved to form parallel ribs or teeth 43, deep grooves 44 and shallow grooves 45. At their lower ends, the teeth 43 have inclined cam surfaces 43' for engagement with the teeth 33 of the ratchet spline 31 when the latter has been rotated to engaging position. The teeth 33 fit within the deep grooves 44 but are of too great diameter to enter the shallow grooves 45. The teeth 36 of the spline drive button 35 fit within both the deep and the shallow grooves 44, 45, of the splined sleeve 40. A push button cover 46 protrudes from the top wall of the iron handle 11, and is fixed on the upper end 47 of the drive button 35.

The operation of the described mechanism is as follows: The dial 19 is manually adjusted for desired temperature of the sole plate, and through engagement with the finger 17 of the rotatable drive member 15, the latter is rotated and moves the chain 13 to adjust the thermostatic mechanism 12. If the valve control button 46 is in raised position, the valve mechanism is in the FIG. 2 open valve "steam" position. To convert to closed-valve operation, the button 46 is depressed manually, thereby depressing the splined button 35. The teeth 36 of the button 35 then contact the teeth 33 on the tubular body 32 of the ratchet spline 31, thereby depressing the ratchet spline and, through spring 30, depressing the cam body block 24 and stem 20. Spring 30, when depressed, overcomes lower spring 27. Due to the form of the engaging teeth, the ratchet spline is caused to rotate (after it has been depressed sufficiently to have its teeth 33 move downwardly out of the deep grooves 44 of the splined sleeve 40), and this rotary motion imparted to the ratchet spline 31 moves the teeth 33 into locking engagement with the cam surfaces 43' on the lower ends of the teeth 43 in the sleeve 40. Thus the cam body block 24 and the valve stem 20 are moved downwardly by the ratchet spline 31, and the latter is locked in depressed position by the engagement of the teeth 33 with the cam surfaces 43' on the teeth.

To re-convert the mechanism to open-valve "steam" operation, the button cover 46 is depressed again, whereby the splined drive button 35 with teeth 36 is also depressed and again exerts pressure on the ratchet spline teeth 33, causing the ratchet spline to rotate until the teeth 33 have moved sufficiently to be released from the locking engagement with cam surfaces 43' of the teeth 43 of the sleeve 40. Then the teeth 33 are free to move upwardly again in the deep grooves 44, and at the same time the cam body block 24 and valve stem 20 move upwardly under influence of the expanding spring 27.

Reverting to the temperature control means 15–19, the cam surface on the bottom of the drive member 15, contacting the cam follower pin 26, controls the volume of water which passes through the valve 22 when the valve stem 20 is in the open position of FIG. 2. Rotation of the drive member 15 by adjustment of the dial 19 adjusts the positions of the cam body block 24 and stem 20 in axial directions, permitting increased volume of water to pass through the valve when the temperature of the sole plate is raised.

In describing the invention, reference has been made to a particular example embodying the same, but I wish it to be understood that the invention is not limited to the construction shown in the drawing and that various changes may be made in the construction and general arrangement of parts without departing from the invention.

I claim:

1. An electric iron convertible from steam to dry and vice versa operation comprising
    (a) a pushbutton depressibly mounted in the iron,
    (b) a valve seat and a longitudinally reciprocable valve stem,
    (c) means movable in axial directions for moving the stem to closed-valve position when the button is depressed,
    (d) a stationary member mounted in the iron adjacent the movable means,
    (e) said movable means including a rotatable member rotated by depression of the button into engagement with the stationary member to hold the rotated member and stem in closed-valve position and rotated by a succeeding depression of the button to release the rotated member from engagement with the stationary member, and
    (f) means automatically moving said movable means and valve stem to open-valve position when the rotated member is released.

2. The iron defined by claim 1, in which the pushbutton, valve stem and seat are co-axial and are vertically disposed in the forward part of the iron.

3. The iron defined by claim 1, in which the movable means include a non-rotatable toothed member contacted by the pushbutton, and the rotatable member has teeth engaged by the teeth of the non-rotatable member for causing rotation of said rotatable member.

4. The iron defined by claim 1, which includes a heating element, thermostatic mechanism and a rotatable dial for adjusting the thermostatic mechanism, and in which the pushbutton is depressibly mounted in the rotatable dial.

5. The iron defined by claim 1, which includes a heating element, thermostatic mechanism and a rotatable dial for adjusting the thermostatic mechanism, and in which the valve stem has mounted thereon a cam body block engaged by the dial for adjusting the valve stem in its open-valve position to control the water volume passing through the valve.

6. The iron defined by claim 1 which includes a reservoir containing body, a handle attached to the body and having a hollow forward portion, a heating element, thermostatic mechanism and a rotatable dial for adjusting the thermostatic mechanism, and in which the push button is depressibly mounted in the rotatable dial in the hollow forward portion of the handle.

7. An electric iron convertible from steam to dry and vice versa operation comprising
    (a) a pushbutton depressibly mounted in the iron,
    (b) a valve seat and a valve stem co-axial with the pushbutton reciprocable in axial directions into open and closed valve positions relatively to the valve seat,
    (c) splined drive means on the pushbutton,
    (d) a rotatable ratchet spline engaged by the drive means,
    (e) a stationarily mounted internally splined sleeve in which the drive means and ratchet spline are slidable,
    (f) means on the sleeve engaging the rotatable ratchet spline when the ratchet spline has been depressed and rotated by the drive means to thereby hold the ratchet spline in depressed position,
    (g) axially movable means between the ratchet spline and valve stem for moving the stem to closed-valve position by depression of the pushbutton, and
    (h) yielding means for automatically moving the valve stem to open-valve position when the pushbutton is depressed and the ratchet spline rotated to disengage it from the splined sleeve.

8. The iron defined by claim 7, which includes a heating element, thermostatic mechanism and a rotatable dial for adjusting the thermostatic mechanism, and in which the pushbutton is depressibly mounted in the rotatable dial.

9. The iron defined by claim 7, which includes a heating element, thermostatic mechanism and a rotatable dial for adjusting the thermostatic mechanism, and in which the valve stem has mounted thereon a cam body block engaged by the dial for adjusting the valve stem in its open-valve position to control the water volume passing through the valve.

10. The iron defined by claim 7, which includes a reservoir containing body, a handle attached to the body and having a hollow forward portion, a heating element, thermostatic mechanism and a rotatable dial for adjusting the thermostatic mechanism, and in which the pushbutton is depressibly mounted in the rotatable dial in the hollow forward portion of the handle.

11. An electric iron convertible from steam to dry and vice versa operation comprising
 (a) a pushbutton depressibly mounted in the iron,
 (b) a valve seat and a longitudinally reciprocable valve stem below the button;
 (c) means between the button and seat and movable in axial directions for moving the stem to closed-valve position when the button is depressed;
 (d) a stationary member mounted in the iron adjacent the movable means;
 (e) said movable means including a rotatable member rotated by depression of the button to a position in which a portion of it is below the stationary member and in vertical alignment therewith and rotated by a succeeding depression of the button to a position in which the portion is in non-alignment with the stationary member;
 (f) first resilient means biasing the movable means and the valve stem upward; and
 (g) second resilient means disposed between the movable means and the valve stem and acting in opposition to the first resilient means and holding the stem down against the seat when the movable means is below the stationary member.

References Cited

UNITED STATES PATENTS

| | | |
|---|---|---|
| 2,797,507 | 7/1957 | Maykemper. |
| 2,976,627 | 3/1961 | Kistner et al. |
| 3,136,080 | 6/1964 | Albrecht. |
| 3,165,843 | 1/1965 | Willman. |

PATRICK D. LAWSON, *Primary Examiner.*